United States Patent [19]

Erdi

[11] Patent Number: 4,837,496

[45] Date of Patent: Jun. 6, 1989

[54] LOW VOLTAGE CURRENT SOURCE/START-UP CIRCUIT

[75] Inventor: George Erdi, Portola Valley, Calif.

[73] Assignee: Linear Technology Corporation, Milpitas, Calif.

[21] Appl. No.: 173,758

[22] Filed: Mar. 28, 1988

[51] Int. Cl.[4] ................................................ G05F 3/20

[52] U.S. Cl. ..................................... 323/315; 323/316

[58] Field of Search ................................ 323/315, 316

[56] References Cited

U.S. PATENT DOCUMENTS

| | | | |
|---|---|---|---|
| 3,835,410 | 9/1974 | Wittlinger | 323/315 |
| 3,930,172 | 12/1975 | Dobkin | 323/316 |
| 4,308,496 | 12/1981 | Nagano | 323/315 |
| 4,352,057 | 9/1982 | Okada et al. | 323/315 |
| 4,370,608 | 1/1983 | Nagano et al. | 323/316 |
| 4,399,399 | 8/1983 | Joseph | 323/316 |
| 4,525,682 | 6/1985 | Lai et al. | 323/315 |
| 4,563,632 | 1/1986 | Palara et al. | 323/316 |
| 4,574,233 | 3/1986 | Taylor | 323/316 |
| 4,578,633 | 3/1986 | Aoki | 323/315 |
| 4,733,161 | 3/1988 | Kuwahara | 323/315 |

*Primary Examiner*—Patrick R. Salce
*Assistant Examiner*—Jeffrey Sterrett
*Attorney, Agent, or Firm*—Flehr, Hohbach, Test, Albritton & Herbert

[57] ABSTRACT

A start-up circuit/current source includes a first current path including serially connected first field effect transistor, first resistor, first bipolar transistor, and second resistor. A second current path includes a second field effect transistor, a second bipolar transistor, and a third resistor. The base electrodes of the first and second bipolar transistors are interconnected, and the base and collector of the second bipolar transistor are shorted together. A first current source includes a bipolar transistor serially connected through the third resistor, the base of the third bipolar transistor connected to the first current path. A second current source can be provided including a fourth bipolar transistor serially connected with a fourth resistor and with the base of the fourth transistor connected to a common terminal of the first resistor and first bipolar transistor. The two field effect transistors can be replaced by two equal resistors or by a single field effect transistor serially connected with a two-collector PNP bipolar transistor which provides the equal currents for the two current paths. The current source is independent of supply voltage and the magnitude of the currents in the two current paths so long as the currents are equal. Accordingly, the circuit is independent of poorly-controlled currents in field effect transistors so long as the currents are equal.

6 Claims, 2 Drawing Sheets

LOW VOLTAGE CURRENT SOURCE/START-UP CIRCUIT

BACKGROUND OF THE INVENTION

This invention relates generally to current source circuits, and more particularly the invention relates to a current source circuit which can be operated from a low-voltage variable power supply and is independent of power supply voltage and start-up currents.

A current source circuit typically has a high output impedance but produces current which is not necessarily independent of the power supply voltage. Dobkin U.S. Pat. No. 3,930,172 discloses a circuit which is independent of power supply. As described in the patent, a first pair of transistors is connected in series with one another between the supply and a second pair of transistors is connected in series with one another between the supply. The base-emitter junctions of the transistors are connected in a series loop, such that a voltage is developed between the base-emitter junctions of two adjacent transistors which is equal to the base-emitter voltage summation. The base-emitter voltages of any series-connected transistors oppose one another in the series loop. Since the collector currents of any series-connected transistors are equal to one another and their base-emitter voltages oppose one another in the series loop, the base-emitter voltage summation is independent of collector currents and, therefore, independent of the input supply. However, the Dobkin circuit requires voltage equal to two base-emitter voltage drops ($V_{BE}$) for minimum operation. The output resistance is actually negative.

Taylor U.S. Pat. No. 4,574,233 discloses a circuit including a first transistor having an output current which is sensed across a resistance connected between the emitter of the first transistor and the negative side of a supply voltage. A series-negative feedback loop comprising two transistors is connected between the emitter of the first transistor and the base of the first transistor. The three transistors and the other circuit components are selected to result in an incremental output resistance approaching that of a cascode current source, while having a voltage drop across the circuit of substantially less than one volt. However, the output current through the first transistor is dependent on input currents through the pair of transistors which are in turn dependent on the power supply.

SUMMARY OF THE INVENTION

An object of the present invention is an improved start-up circuit/current source whose operation is independent of power supply.

Another object of the invention is a circuit which operates from a power supply having a voltage as low as a single base-emitter voltage drop ($V_{BE}$).

A feature of the invention is the use of two equal start-up currents and feedback circuitry whereby two current sources operate independently of the start-up current magnitudes and the magnitude of the start-up currents does not have to be accurately controlled.

The invention and objects and features thereof will be more readily apparent from the following detailed description and appended claims when taken with the drawing.

DETAILED DESCRIPTION OF ILLUSTRATIVE EMBODIMENTS

Figure 1:
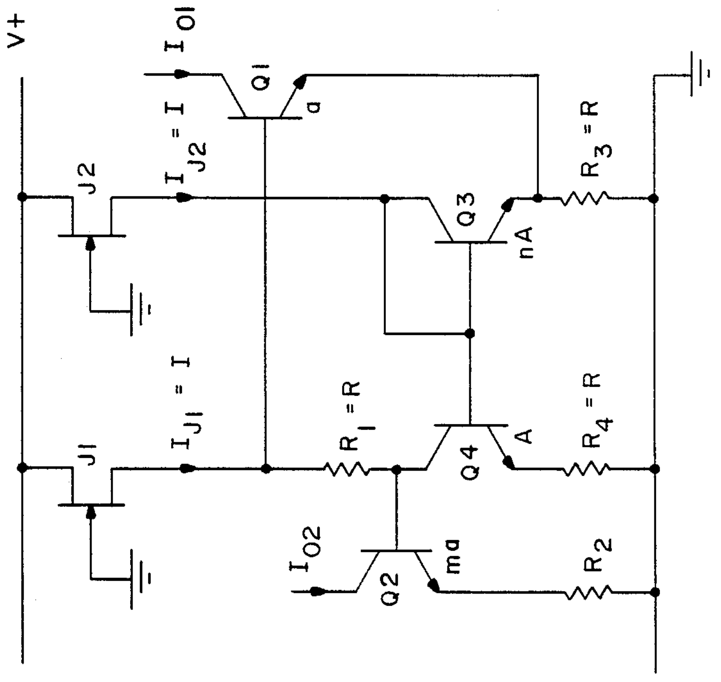
FIG. 1 is a schematic of a start-up circuit/current source in accordance with one embodiment of the invention.

FIG. 1 is a schematic of a start-up circuit/current source in accordance with one embodiment of the invention in which two current sources, $I_{01}$ and $I_{02}$, are provided using two start-up FET currents, $I_{J1}$ and $I_{J2}$. The magnitude of $I_{01}$ and $I_{02}$ is independent of $I_{J1}$ and $I_{J2}$ and the power supply voltage V+. In this embodiment the total supply voltage (V+ to ground) does not have to be more than a base-emitter voltage drop (for transistors Q1 and Q3) plus a small resistive drop across a resistor R3, and a small saturation voltage across FETs J1 or J2.

The embodiment of FIG. 1 is similar to the circuit of U.S. Pat. No. 4,574,233, supra. However, the patented circuit produces an output current which is a function of start-up currents and thus a function of the power supply voltage, whereas the circuit of FIG. 1 produces an output current which is independent of power supply voltage. This is accomplished by making the two start-up currents equal and having the emitter areas of Q3 and Q4 unequal as will be described below.

In a practical integrated circuit implementation, the magnitude of FET currents of J1 and J2 is difficult to control, but they can be made equal. The FETs can be operated in the pinched-off region or in the linear (resistive) region. In fact, the two FETs can be replaced by two equal value resistors.

The start-up current $I_{J1}$ is provided through the serial circuit comprising FET J1, resistor R1, NPN transistor Q4, and resistor R4 between V+ and ground. The start-up current $I_{J2}$ is provided through the serial circuit comprising FET J2, NPN transistor Q3 (having shorted collector and base), and resistor R3 from V+ to ground. The bases of transistors Q3 and Q4 are connected. The current source $I_{01}$ is provided through NPN transistor Q1 (having a base bias provided by the start-up current $I_{J1}$) and the series resistor R3. The current source $I_{02}$ is provided through NPN transistor Q2 (having a base bias generated by start-up current $I_{J1}$) and a series resistor R2. Resistors R1, R3 and R4 are equal in resistance to a value R.

The output resistance of current source $I_{01}$ is extremely high and effectively the output resistance of a common-base configured transistor. The base voltage of transistor Q1 with respect to ground, however, is a function of $I_{J2}$ flowing through resistor R3.

The output resistance of current source $I_{02}$ is not as high as the output resistance of current source $I_{01}$ since transistor Q2 is in a common-emitter configuration degenerated by R2. However, the base voltage of transistor Q2 is independent of start-up FET currents $I_{J1}$ and $I_{J2}$.

Both current sources will work with low output voltages on the order of a saturation voltage plus a small resistance drop. For current source $I_{01}$ the minimum voltage is a saturation voltage of transistor Q1 and a voltage drop across resistor R3, and for $I_{02}$ the minimum voltage is a saturation voltage of transistor Q2 and the voltage drop across resistor R2. In operation, the two identical FETs J1 and J2 generate two equal currents:

$$I_{J1}=I_{J2}=I$$

Neglecting base currents, current I will flow through transistors Q3 and Q4. Since the emitter area of Q3 (nA) is n times larger than the emitter area of transistor Q4 (A), the base-emitter voltage differential will be $$V_{BEQ4}-V_{BEQ3}=\frac{kT}{q}\ln n \quad (1)$$

If $R_3=R_4=R$, then $$V_{BEQ4}+IR_4=V_{BEQ3}+IR_3+I_{01}R_3 \quad (2)$$

Therefore $$I_{01}=\frac{kT}{qR}\ln n \quad (3)$$

independent of current I.

The output impedance of Q1 is high because as the collector voltage of Q1 is increased, and its base-emitter voltage is reduced due to the Early effect, the current $I_{01}$, which is not a function of $V_{BEQ1}$, will not change.

The equation defining $I_{02}$ is:

$$IR_3+I_{01}R_3+V_{BEQ1}=IR_1+V_{BEQ2}+I_{02}R_2 \quad (4)$$

If $R_3=R_1=R$, the emitter area of Q1 is a, the emitter area of Q2 is m times a, and $I_{01}$ is as defined above, then $$I_{02}R_2=IR+\frac{kT}{q}\ln n+\frac{kT}{q}\ln\left(\frac{I_{01}}{I_{02}}m\right)-IR \quad (5)$$

$$I_{02}=\frac{kT}{qR_2}\ln\left[\frac{mn\left(\frac{kT}{qR}\ln n\right)}{I_{02}}\right] \quad (6)$$

Therefore, $I_{02}$ is independent of I.

The output impedance of current source $I_{02}$ is not as high as the $I_{01}$ output impedance because $I_{02}$ is dependent on $V_{BEQ2}$, which reduces due to increasing collector voltage on Q2. However, if the collector voltage of Q2 tracks the collector voltage of Q1, the $V_{BE}$ variations in Q1 and Q2 due to the Early effect will be equal in equation (4), and the effective output resistance of $I_{02}$ will be high.

If only $I_{01}$ (and not $I_{02}$) is required the circuit of FIG. 1 can be simplified by shorting out R1 and deleting Q2 and R2.

In another implementation of the circuit FETs J1 and J2 can be replaced by matched resistors; the absolute value of the current I, through the resistors, will vary significantly with supply voltage, but as long as the two currents match, the above equations will be satisfied.

Figure 2:
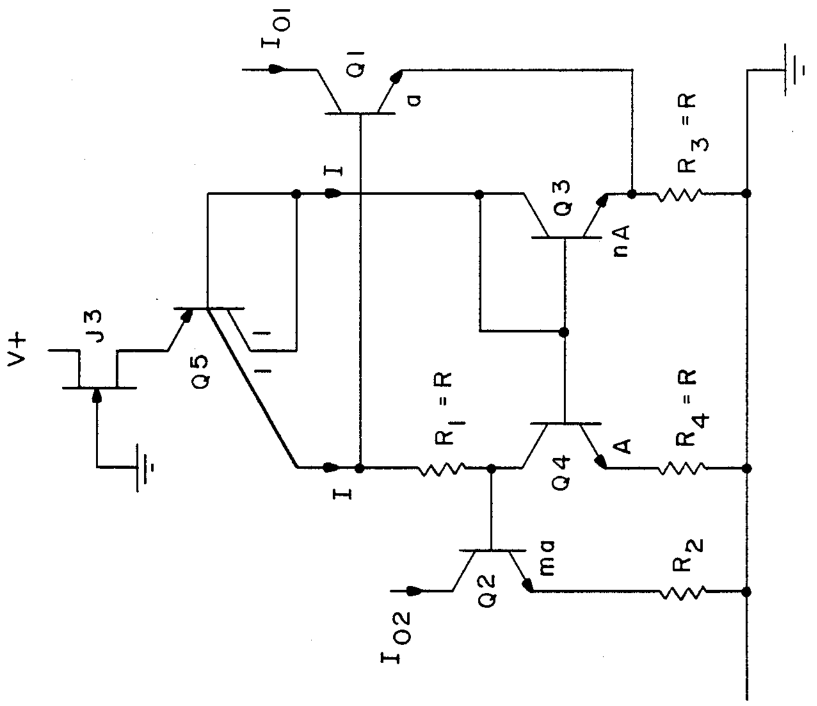
FIG. 2 is a schematic of a start-up circuit/current source in accordance with another embodiment of the invention.
Figure 3:
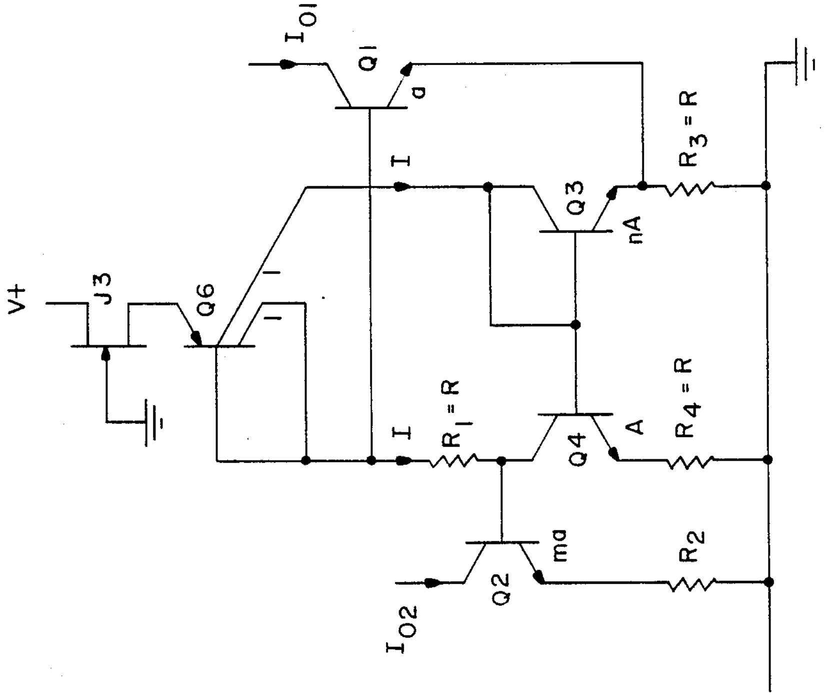
FIG. 3 is a schematic of a start-up circuit/current source in accordance with still another embodiment of the invention.

If the circuit does not have to work on a total supply voltage of one base-emitter voltage ($V_{BE}$), but two $V_{BE}$'s can be tolerated, the generation of the two equal currents I can be accomplished by the connections shown in FIGS. 2 and 3. Here only one FET (J3) is needed; Q5 or Q6 split the current into equal segments.

Figure 4:
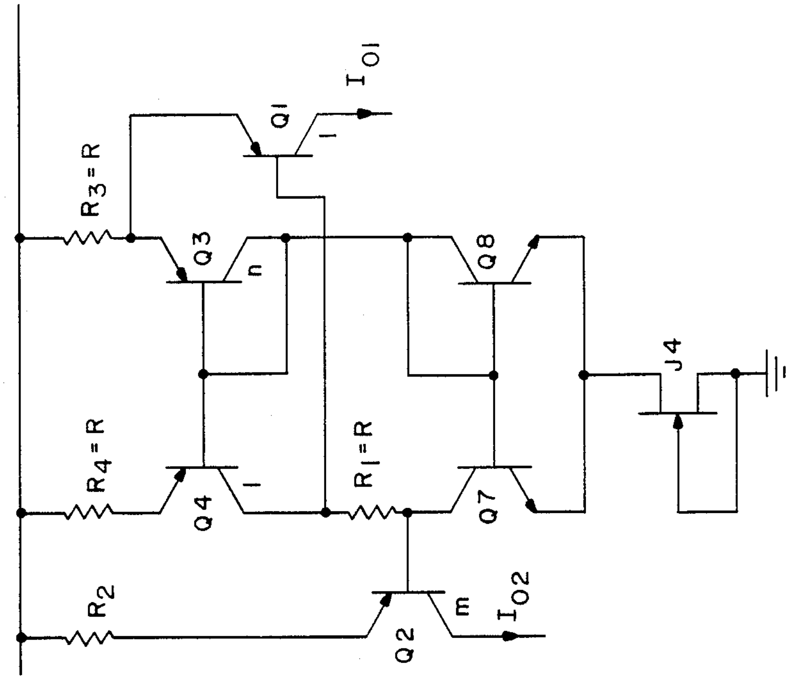
FIG. 4 is a schematic of another embodiment of the start-up circuit/current source of FIGS. 2 and 3 but using opposite conductivity-type bipolar transistors.

FIG. 4 is a schematic of another embodiment in which PNP (sourcing) transistor current sources are achieved by replacing the NPN transistors Q1, Q2, Q3, and Q4 by PNP transistors. Emitter scaling is then achieved by emitter periphery and not by emitter area ratioing. Transistor Q5 and transistor Q6 of FIGS. 2 and 3 are replaced by two matched NPN transistors Q7, Q8.

There has been described an improved start-up/current source circuit whose operation is independent of the power supply and the start-up current. While the invention has been described with reference to specific embodiments, the description is illustrative of the invention and is not to be construed as limiting the invention. Thus, various modifications and applications may occur to those skilled in the art without departing from the true spirit and scope of the invention as defined by the appended claims.

I claim:

1. A start-up/current source circuit providing current source outputs that are independent of power supply voltage and start-up currents comprising first and second voltage potentials, first and second current paths connected between said first and second voltage potentials for conducting equal currents, said first current path including a first bipolar transistor serially connected with a first resistor and said second current path including a second bipolar transistor serially connected with a second resistor, said first and second resistors being equal, the base and collector of said second transistor being connected, the emitter of said second transistor being larger than the emitter of said first transistor and the bases of said first and second transistors being connected, said first and second current paths further including first and second field effect transistors serially connected with said first and second bipolar transistors and said first and second resistors, respectively, the currents through said first and second field effect transistors being equal, and a first current source including a third bipolar transistor serially connected with said second resistor, the base of said third transistor being connected to said first current path.

2. The circuit as defined by claim 1 and further including a third resistor equal to each of said first and second resistors and serially connected in said first current path between said first field effect transistor and said first transistor, a second current source including a fourth bipolar transistor serially connected with a fourth resistor, the base of said fourth transistor being connected to a common terminal of said third resistor and said first bipolar transistor, the base of said third transistor being connected to a common terminal of said first field effect transistor and said third resistor.

3. A start-up/current source circuit providing current source outputs that are independent of power supply voltage and start-up currents comprising first and second voltage potentials, first and second current paths connected between said first and second voltage potentials for conducting equal currents, said first current path including a first bipolar transistor serially connected with a first resistor and said second current path including a second bipolar transistor serially connected with a second resistor, said first and second resistors being equal, the base and collector of said second transistor being connected, the emitter of said second transistor being larger than the emitter of said first transistor and the bases of said first and second transistors being connected, a field effect transistor serially connected with a two-collector bipolar transistor, wherein said first current path includes one collector of said two-collector bipolar transistor, and said second current path includes the other collector of said two-collector bipolar transistor and said field effect transistor, currents through said first and second current paths being equal, a first current source including a third bipolar transistor serially connected with said second resistor, the base of said third transistor being connected to said first current path.

4. The circuit as defined by claim 3 wherein said first, second, and third bipolar transistors are NPN transistors and said two-collector bipolar transistor is a PNP transistor.

5. A start-up/current source circuit providing current source outputs that are independent of power supply voltage and start-up currents comprising first and second voltage potentials, first and second current paths connected between said first and second voltage potentials for conducting equal currents, said first current path including a first bipolar transistor serially connected with a first resistor and said second current path including a second bipolar transistor serially connected with a second resistor, said first and second resistors being equal, the base and collector of said second transistor being connected, the emitter of said second transistor being larger than the emitter of said first transistor and the bases of said first and second transistors being connected, fourth and fifth bipolar transistors and a field effect transistor, wherein said first and second current paths are connected to said fourth and fifth bipolar transistors, respectively, and through said field effect transistor to said first voltage potential, currents through said first and second current paths being equal, a first current source including a third bipolar transistor serially connected with said second resistor, the base of said third transistor being connected to said first current path.

6. The circuit as defined by claim 5 wherein said first, second, and third bipolar transistors are PNP transistors and said fourth and fifth bipolar transistors are matched NPN transistors.

* * * * *